United States Patent
Kamiya et al.

(10) Patent No.: US 10,006,484 B2
(45) Date of Patent: Jun. 26, 2018

(54) SLIDE BEARING AND LUBRICANT FEED MECHANISM HAVING THE SAME

(71) Applicant: Taiho Kogyo Co., Ltd., Toyota-shi, Aichi (JP)

(72) Inventors: Shuu Kamiya, Toyota (JP); Yuichiro Kajiki, Toyota (JP); Keiji Yuda, Toyota (JP); Yasushi Nakatake, Toyota (JP)

(73) Assignee: Taiho Kogyo Co., Ltd., Toyota-shi, Aichi (JP)

( * ) Notice: Subject to any disclaimer, the term of this patent is extended or adjusted under 35 U.S.C. 154(b) by 0 days. days.

(21) Appl. No.: 15/112,385

(22) PCT Filed: Feb. 4, 2015

(86) PCT No.: PCT/JP2015/053131
§ 371 (c)(1),
(2) Date: Jul. 18, 2016

(87) PCT Pub. No.: WO2015/122331
PCT Pub. Date: Aug. 20, 2015

(65) Prior Publication Data
US 2016/0341242 A1    Nov. 24, 2016

(30) Foreign Application Priority Data

Feb. 14, 2014 (JP) .................................. 2014-027004
Feb. 14, 2014 (JP) .................................. 2014-027006

(51) Int. Cl.
*F16C 9/02* (2006.01)
*F16C 17/02* (2006.01)
(Continued)

(52) U.S. Cl.
CPC .................. *F16C 9/02* (2013.01); *F16C 9/04* (2013.01); *F16C 17/022* (2013.01); *F16C 33/046* (2013.01); *F16C 33/1065* (2013.01); *F16C 33/1075* (2013.01); *F16C 2360/22* (2013.01)

(58) Field of Classification Search
CPC .... F16C 9/02; F16C 9/04; F16C 9/045; F16C 17/022; F16C 33/106; F16C 33/1065
See application file for complete search history.

(56) References Cited

U.S. PATENT DOCUMENTS 5,009,522 A * 4/1991 Hahn ........................ F16C 9/02
                                                         384/273
7,234,870 B2 * 6/2007 Kitahara ................... F16C 9/02
                                                         384/288
(Continued)

FOREIGN PATENT DOCUMENTS

DE    102006010698    *  9/2007
JP    7-139539 A         5/1995
(Continued)

OTHER PUBLICATIONS

Office Action (Notification of Reasons for Refusal) dated May 23, 2017, by the Japanese Patent Office in corresponding Japanese Patent Application No. 2014-027006, and an English Translation of the Office Action. (6 pages).
(Continued)

*Primary Examiner* — James Pilkington
(74) *Attorney, Agent, or Firm* — Buchanan Ingersoll & Rooney PC

(57) ABSTRACT

There is provided a slide bearing capable of preventing or reducing a temperature increase in lubricant. A cylindrical main bearing is formed by combining a pair of upper bearing and lower bearing and rotatably supports a crank journal. The lower bearing includes a downstream crush relief formed at a downstream end in the rotation direction of the crank journal in an inner periphery of the lower bearing; and an oil groove formed in the inner periphery of the lower bearing so as to communicate with the downstream crush relief.

2 Claims, 16 Drawing Sheets

(51) Int. Cl.
  *F16C 33/10* (2006.01)
  *F16C 9/04* (2006.01)
  *F16C 33/04* (2006.01)

(56) References Cited

U.S. PATENT DOCUMENTS

| | | | | |
|---|---|---|---|---|
| 8,147,144 | B2* | 4/2012 | Ishigo | F16C 9/04 |
| | | | | 384/273 |
| 8,714,824 | B2* | 5/2014 | Ishigo | F16C 9/02 |
| | | | | 384/288 |
| 2005/0196084 | A1 | 9/2005 | Kitahara et al. | |
| 2005/0201647 | A1 | 9/2005 | Kuroda et al. | |
| 2009/0169141 | A1 | 7/2009 | Ishigo et al. | |
| 2013/0182981 | A1 | 7/2013 | Ishigo et al. | |

FOREIGN PATENT DOCUMENTS

| | | |
|---|---|---|
| JP | 10-030419 A | 2/1998 |
| JP | 2005-069284 A | 3/2005 |
| JP | 2005-249024 A | 9/2005 |
| JP | 2005-256917 A | 9/2005 |
| JP | 2006-144913 A | 6/2006 |
| JP | 2009-174697 A | 8/2009 |
| JP | 2013-148105 A | 8/2013 |
| JP | 2015-152107 A | 8/2015 |
| JP | 2016-191420 A | 11/2016 |

OTHER PUBLICATIONS

International Search Report (PCT/ISA/210) dated May 12, 2015, by the Japanese Patent Office as the International Searching Authority for International Application No. PCT/JP2015/053131.

Written Opinion (PCT/ISA/237) dated May 12, 2015, by the Japanese Patent Office as the International Searching Authority for International Application No. PCT/JP2015/053131.

The extended European Search Report dated Sep. 28, 2017, by the European Patent Office in corresponding European Patent Application No. 15749307.3-1751. (7 pages).

* cited by examiner

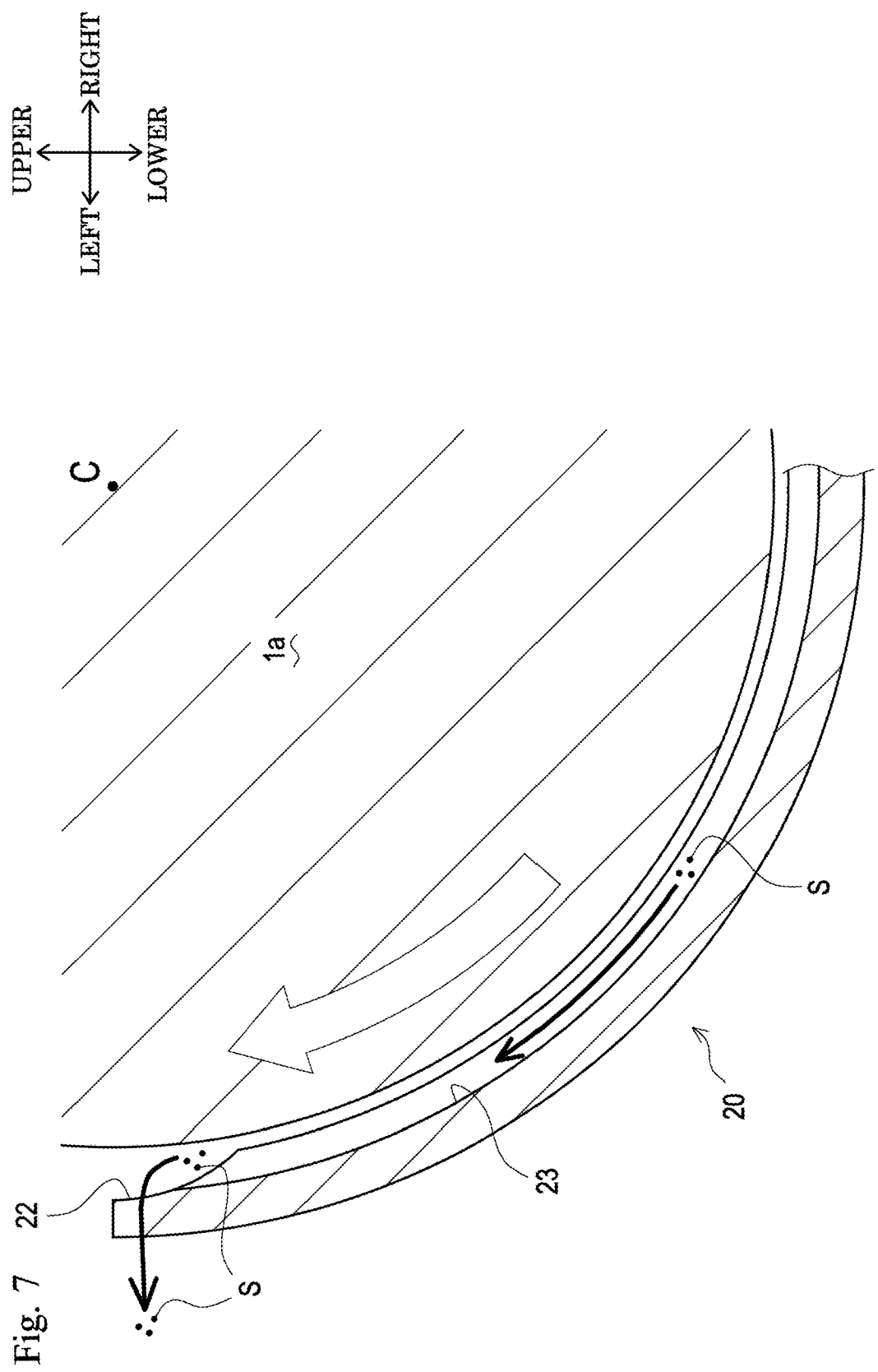

Fig. 14
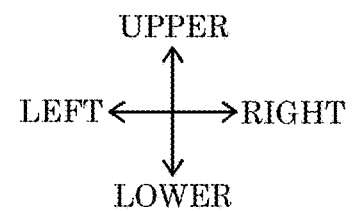
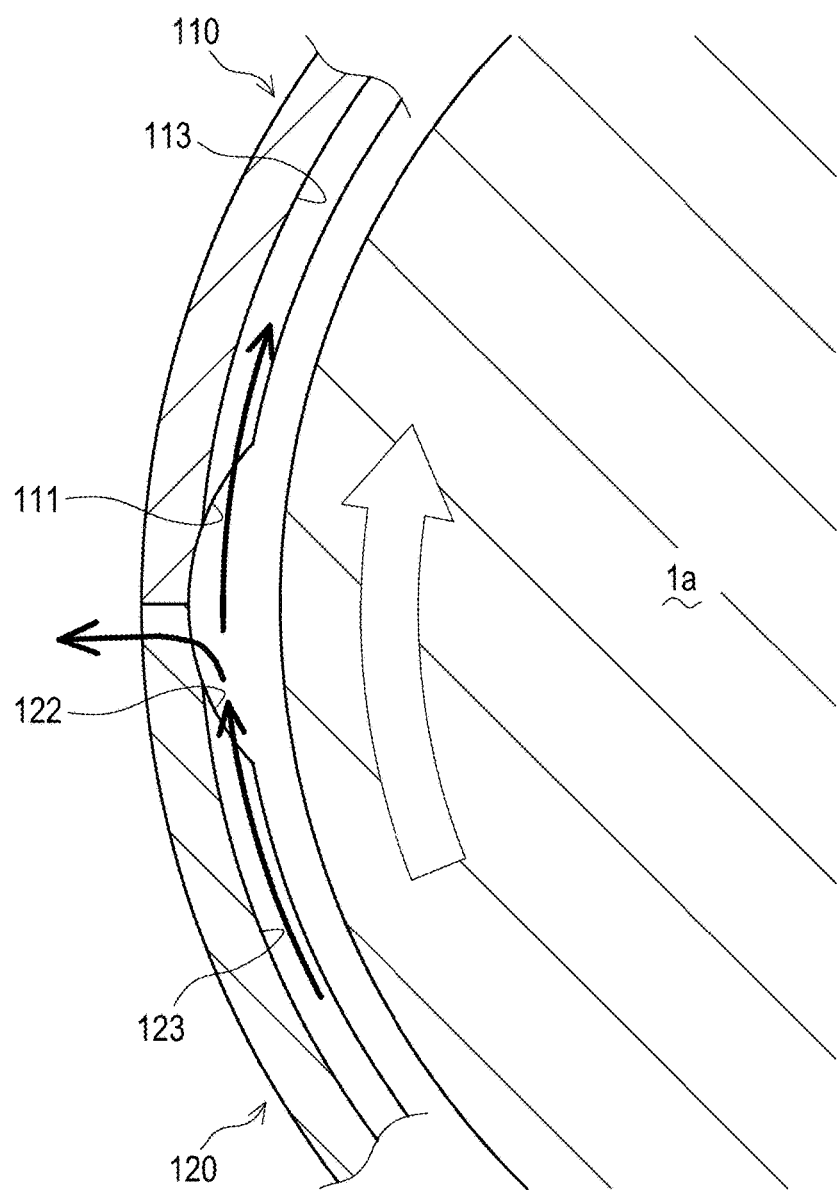

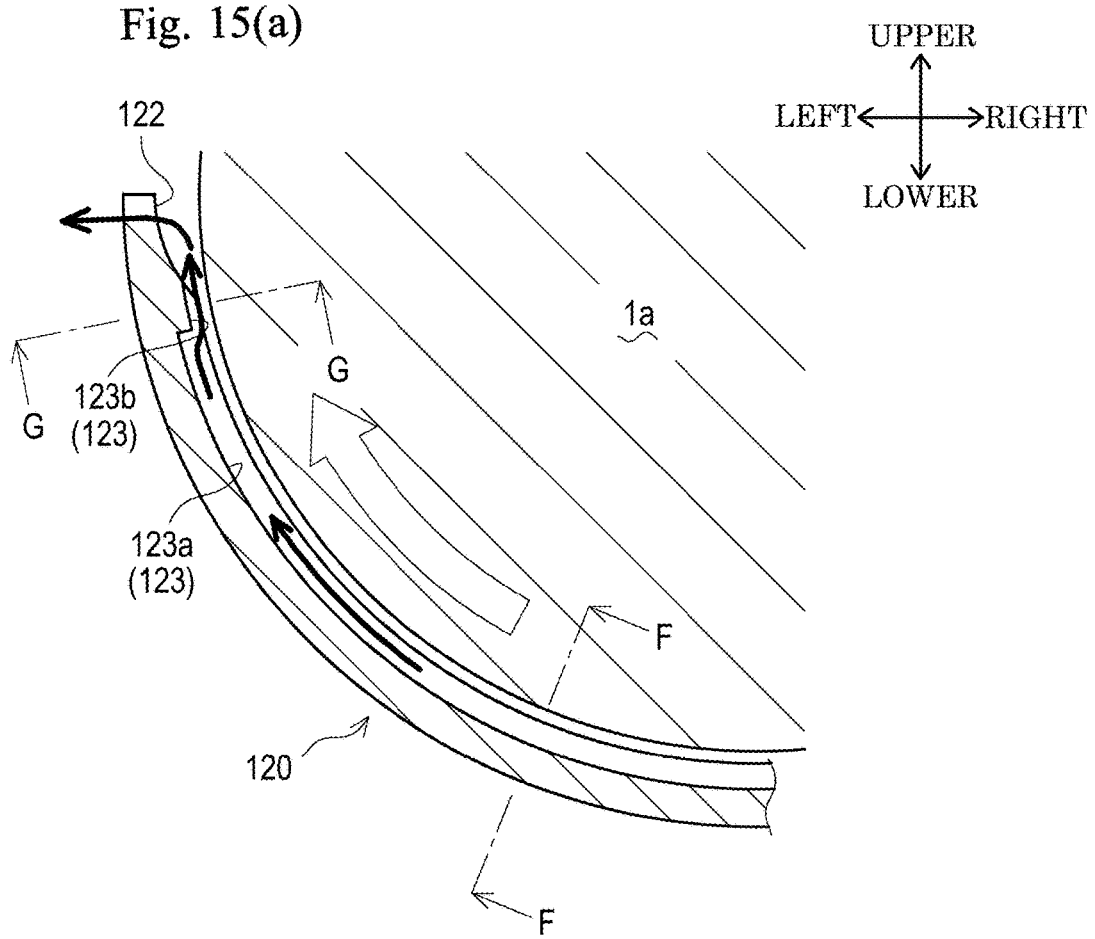
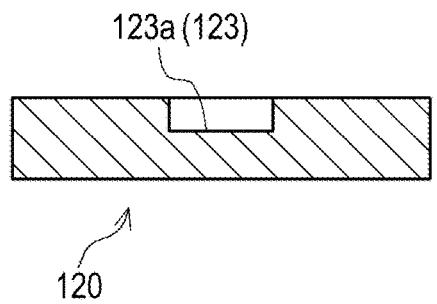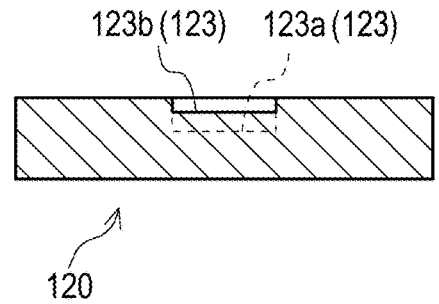

SLIDE BEARING AND LUBRICANT FEED MECHANISM HAVING THE SAME

TECHNICAL FIELD

The present invention relates to a technique for a cylindrical slide bearing that is formed by combining a pair of semi-cylindrical bearings and rotatably supports a shaft member, and a lubricant feed mechanism having the cylindrical slide bearing.

BACKGROUND ART

Conventionally, a technique for a cylindrical slide bearing that is formed by combining a pair of semi-cylindrical bearings and rotatably supports a shaft member has been known. Such a technique is disclosed, for example, in Patent Literature 1.

A split slide bearing (semi-cylindrical bearing) disclosed in Patent Literature 1 includes crush reliefs formed at both ends of its inner periphery, an oil groove formed to extend from the vicinity of one crush relief to the vicinity of the other crush relief, and inflow inhibiting portions that are formed between the oil groove and the respective crush reliefs and prevent lubricant in the oil groove from flowing into the crush reliefs.

In such a slide bearing, the inflow inhibiting portion intervenes between the oil groove and the crush relief so that they communicate with each other. Therefore, the amount of lubricant leaking from the oil groove to the outside of the slide bearing through the crush relief can be reduced. This allows the lubricant in the oil groove to be sufficiently fed to the inner periphery of the slide bearing and prevents or reduces the occurrence of failure (galling, wear, etc.) due to an insufficient amount of lubricant.

However, the technique disclosed in Patent Literature 1 is disadvantageous in that since the lubricant in the oil groove is difficult to flow outwardly, a temperature of the lubricant increases and rather this is likely to cause galling.

CITATION LIST

Patent Literature

Patent Literature 1: JP 2005-249024 A

SUMMARY OF INVENTION

Technical Problem

The present invention has been made in view of the above circumstances, and in order to solve the problem, an object of the present invention is to provide a slide bearing capable of preventing or reducing an increase in temperature of the lubricant and a lubricant feed mechanism having the slide bearing.

Solution to Problem

The problem to be solved by the present invention is that as described above and solutions to the problem are then described.

A slide bearing having a cylindrical shape according to one aspect of the present invention includes a pair of upper and lower semi-cylindrical bearings in combination, and rotatably supports a shaft member. At least one of the pair of upper and lower semi-cylindrical bearings includes a crush relief formed at at least one of upstream and downstream ends in the rotation direction of the shaft member in an inner periphery of the semi-cylindrical bearing, and an oil groove formed in the inner periphery of the semi-cylindrical bearing so as to communicate with the crush relief.

The at least one crush relief preferably includes a lower crush relief formed at the downstream end in the rotation direction of the shaft member in the inner periphery of the lower semi-cylindrical bearing disposed on the lower side of the pair of upper and lower semi-cylindrical bearings. The oil groove preferably includes a lower oil groove formed in the inner periphery of the lower semi-cylindrical bearing so as to communicate with the lower crush relief.

Preferably, the lower oil groove is formed only on the downstream side in the rotation direction of the shaft member in the inner periphery of the lower semi-cylindrical bearing.

The at least one crush relief preferably includes upper crush reliefs formed at the upstream and downstream ends in the rotation direction of the shaft member in the inner periphery of the upper semi-cylindrical bearing disposed on the upper side of the pair of upper and lower semi-cylindrical bearings. The oil groove preferably includes an upper oil groove formed in the inner periphery of the upper semi-cylindrical bearing to communicate from one of the upper crush reliefs to the other.

The at least one crush relief is preferably formed at the upstream and downstream ends in the rotation direction of the shaft member in the inner periphery of the semi-cylindrical bearing. The oil groove is preferably formed in the inner periphery of the semi-cylindrical bearing to communicate from one of the at least one crush relief to the other.

Preferably, the oil groove is formed such that a cross-sectional area of the end communicating with the crush relief formed on the downstream side in the rotation direction of the shaft member is smaller than that of other portions.

A lubricant feed mechanism according to another aspect of the present invention includes a crankshaft having a communication oil passage that communicates between an outer periphery of a crank journal and an outer periphery of a crank pin and directs lubricant from the outer periphery of the crank journal to the outer periphery of the crank pin; and a slide bearing, the crank journal being rotatably supported by the slide bearing.

Advantageous Effects of Invention

The present invention has the following effects.

The slide bearing of the present invention, which helps lubricant in the oil groove to be discharged from the crush relief to the outside, can prevent or reduce an increase in temperature of the lubricant in the oil groove. This prevents or reduces the occurrence of galling of the slide bearing.

The slide bearing of the present invention helps foreign matter entering the lower oil groove to be discharged from the lower crush relief to the outside as the shaft member rotates. This prevents or reduces the occurrence of galling of the slide bearing.

The slide bearing of the present invention can provide a large surface for receiving the shaft member.

The slide bearing of the present invention can discharge foreign matter from the upper crush relief through the upper oil groove even if there remains the foreign matter that has not been discharged from the lower crush relief.

The slide bearing of the present invention, which helps lubricant in the oil groove to be discharged from the crush relief to the outside, can prevent or reduce an increase in temperature of the lubricant in the oil groove. This prevents or reduces the occurrence of galling of the slide bearing.

The slide bearing of the present invention can limit the amount of the lubricant discharged from the crush relief to the outside. Thus, the amount of lubricant required to lubricate the slide bearing can be ensured while helping lubricant to be discharged outwardly.

The lubricant feed mechanism of the present invention can prevent or reduce an increase in temperature of lubricant fed from the slide bearing to the crank pin. This prevents or reduces the occurrence of galling of the crank pin.

BRIEF DESCRIPTION OF DRAWINGS

FIG. 7 is an enlarged front cross-sectional view showing a downstream end of the lower bearing according to the first embodiment.

FIG. 14 is an enlarged front cross-sectional view showing an upstream end of the upper bearing and a downstream end of the lower bearing according to the second embodiment.

FIG. 15(a) is an enlarged front cross-sectional view showing the downstream end of the lower bearing according to the second embodiment, FIG. 15(b) is a cross-sectional view taken along line F-F, and FIG. 15(c) is a cross-sectional view taken along line G-G.

DESCRIPTION OF EMBODIMENTS

In the following description, vertical (upper-lower), longitudinal (anterior-posterior), and lateral (left-right) directions are defined by the arrows in the figures.

Figure 1:
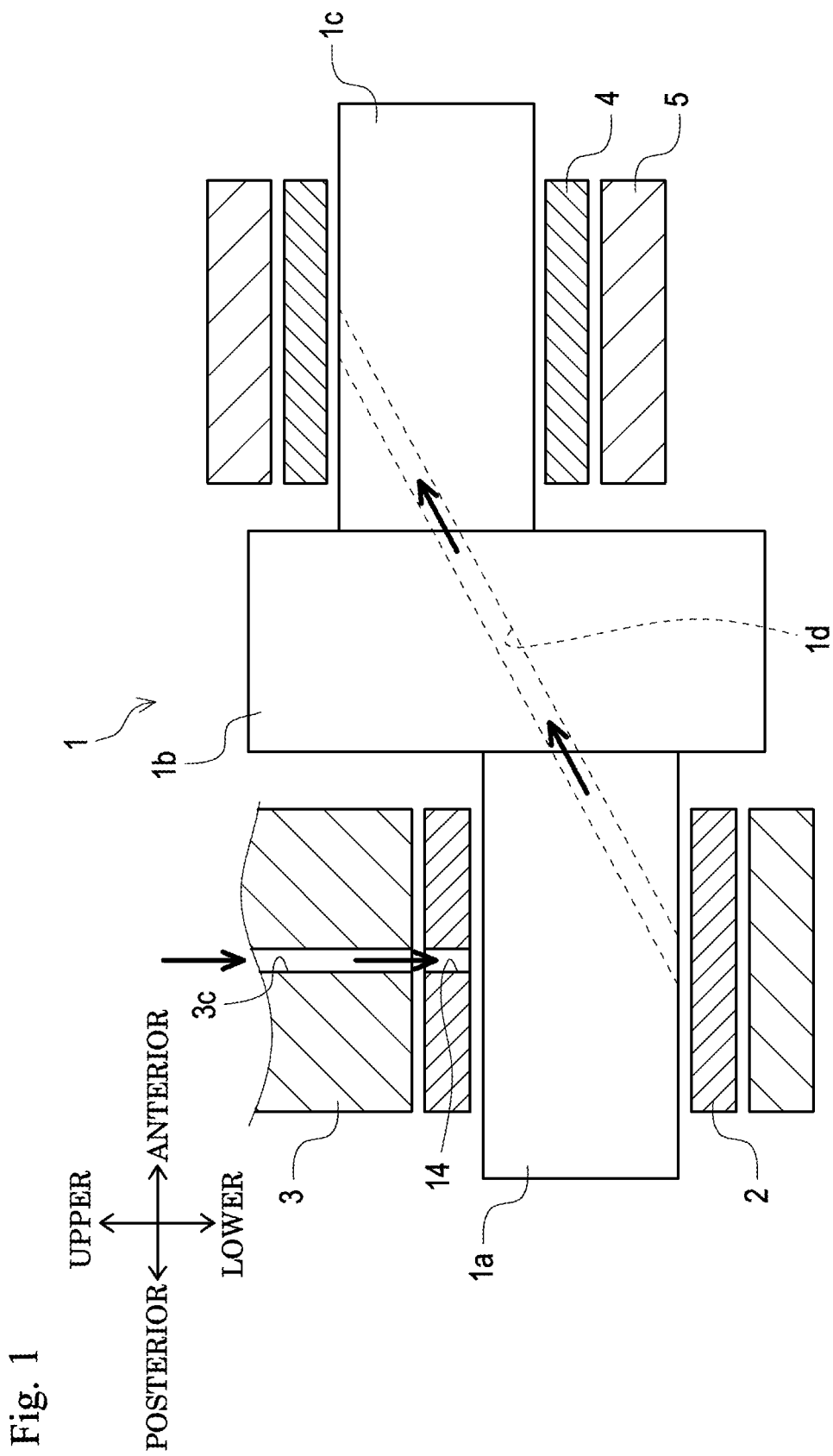
FIG. 1 is a side schematic view showing a schematic structure of a crankshaft.

First, referring to FIG. 1, the structure of a crankshaft 1 on which a main bearing 2 according to a first embodiment of a slide bearing according to the present invention is mounted and a lubricant feed mechanism for the crankshaft 1 is schematically described.

The crankshaft 1, a member constituting an internal combustion engine, is to convert reciprocating motion of a piston into rotary motion. The crankshaft 1 mainly includes a crank journal 1a, a crank arm 1b, a crank pin 1c, and a communication oil passage 1d.

The crank journal 1a, which is an embodiment of a shaft member according to the present invention, is rotatably supported by a cylinder block 3 through the main bearing 2. The main bearing 2 is provided with a through-hole 14 communicating between its outer and inner peripheries. The crank pin 1c is connected to the crank journal 1a through the crank arm 1b. The crank pin 1c is rotatably connected to a connecting rod 5 through a connecting rod bearing 4. The communication oil passage 1d is formed in the crankshaft 1 so that the outer periphery of the crank journal 1a communicates with the outer periphery of the crank pin 1c.

In such a configuration, lubricant from a main oil hole (not shown) is fed to the main bearing 2 through a lubricant passage 3c formed in the cylinder block 3. The lubricant is further fed to the inner periphery of the main bearing 2 through the through-hole 14 of the main bearing 2. The lubricant lubricates a sliding surface between the main bearing 2 and the crank journal 1a.

The lubricant fed to the inner periphery of the main bearing 2 is further fed to the outer periphery of the crank pin 1c through the communication oil passage 1d. The lubricant lubricates a sliding surface between the crank pin 1c and the connecting rod bearing 4.

The structure of a portion connecting the crank journal 1a and the cylinder block 3 (i.e., a supporting portion of the crank journal 1a) is described below with reference to FIG. 2.

The cylinder block 3 includes a body-side housing 3a and a cap 3b secured to the bottom of the body-side housing 3a. The lower end surface of the body-side housing 3a is provided with a bearing portion 3d that is semi-circularly recessed as viewed from the front. The upper end surface of the cap 3b is provided with a bearing portion 3e that is semi-circularly recessed as viewed from the front. The crank journal 1a is supported by being sandwiched between the bearing portion 3d and the bearing portion 3e, and the main bearing 2 is interposed between the cylinder block 3 and the crank journal 1a.

In such a configuration, when the crank journal 1a rotates (assuming it rotates clockwise as viewed from the front in the present embodiment), an oil film of lubricant fed through the lubricant passage 3c is formed between the outer periphery of the crank journal 1a and the inner periphery of the main bearing 2. The crank journal 1a is rotatably supported by the main bearing 2 (and thus by the cylinder block 3) through the oil film.

The structure of the main bearing 2 according to the first embodiment of the slide bearing according to the present invention is described below in detail with reference to FIGS. 2 through 6.

Figure 2:
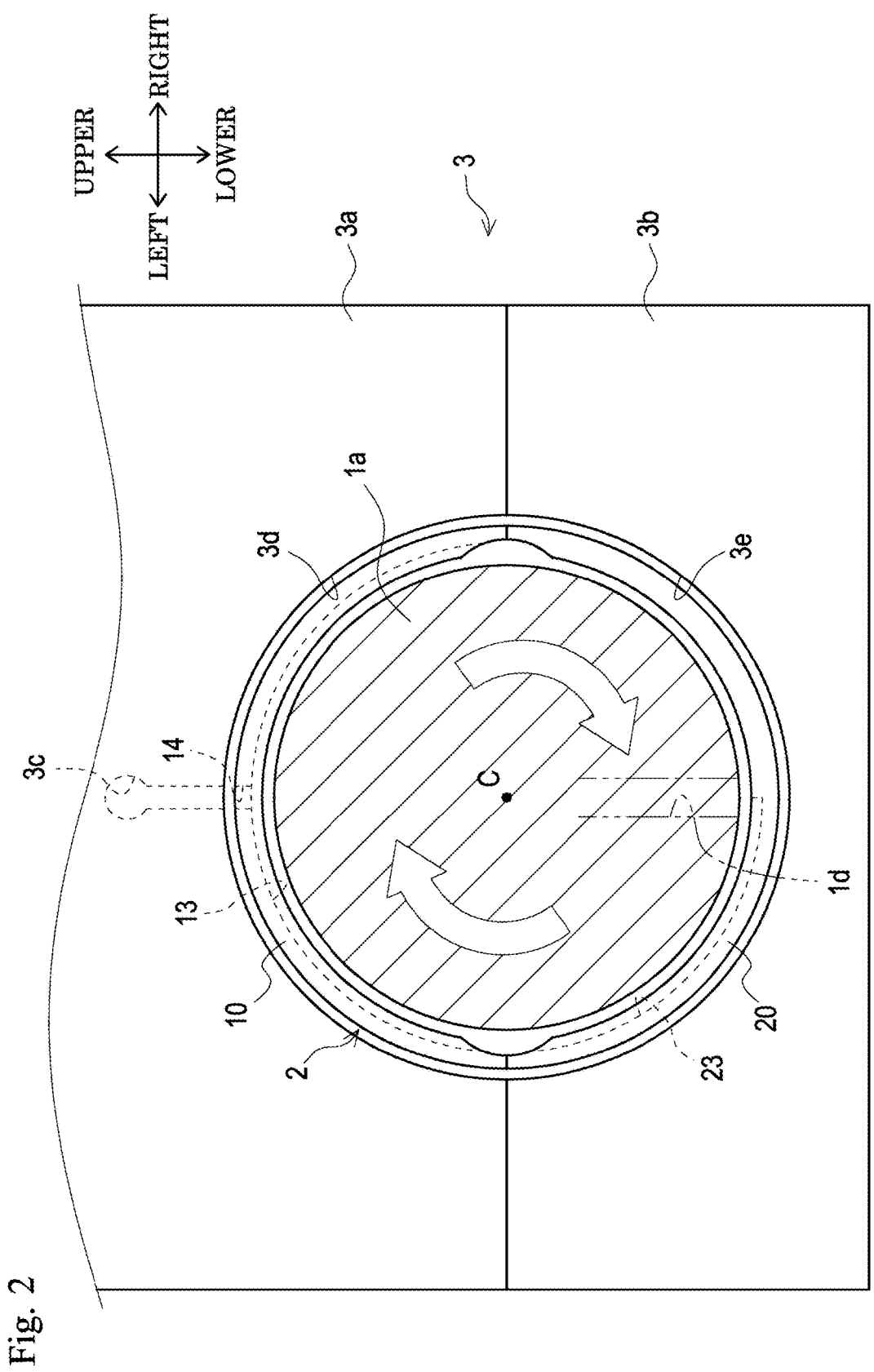
FIG. 2 is a front cross-sectional view showing a structure of a supporting portion of a crank journal according to a first embodiment.
Figure 3:
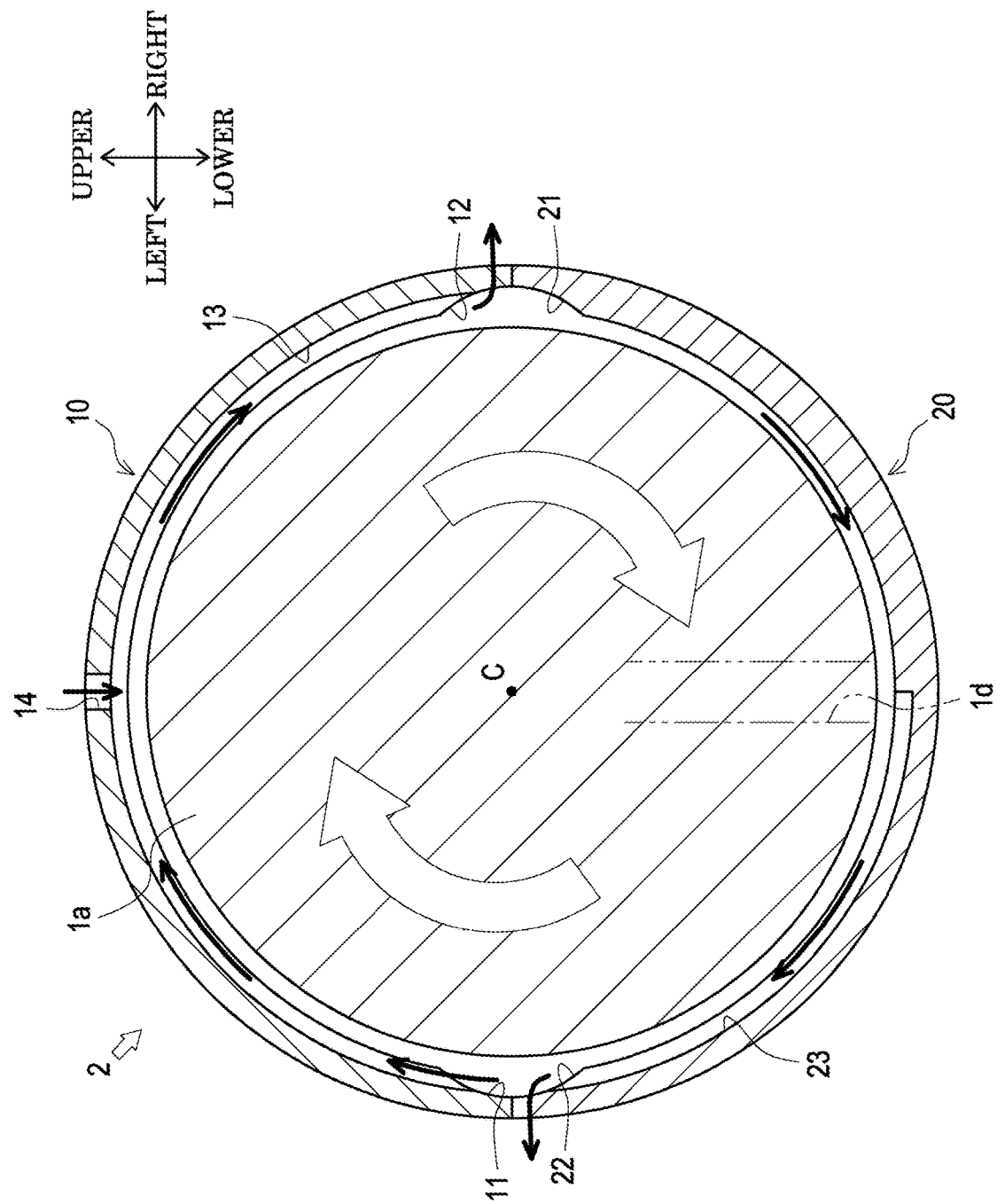
FIG. 3 is a front cross-sectional view showing a main bearing and the crank journal according to the first embodiment.

The main bearing 2 illustrated in FIGS. 2 and 3 is a cylindrical slide bearing for rotatably supporting the crank journal 1a. The main bearing 2 includes a pair of semi-cylindrical bearings (i.e., an upper bearing 10 and a lower bearing 20). The combination of the upper bearing 10 and the lower bearing 20 vertically opposed to each other provides a cylindrical main bearing 2.

In the following description, an axis (a centerline) of the cylindrical main bearing 2 formed by the upper bearing 10 and the lower bearing 20 is defined as axis C.

Figure 4:
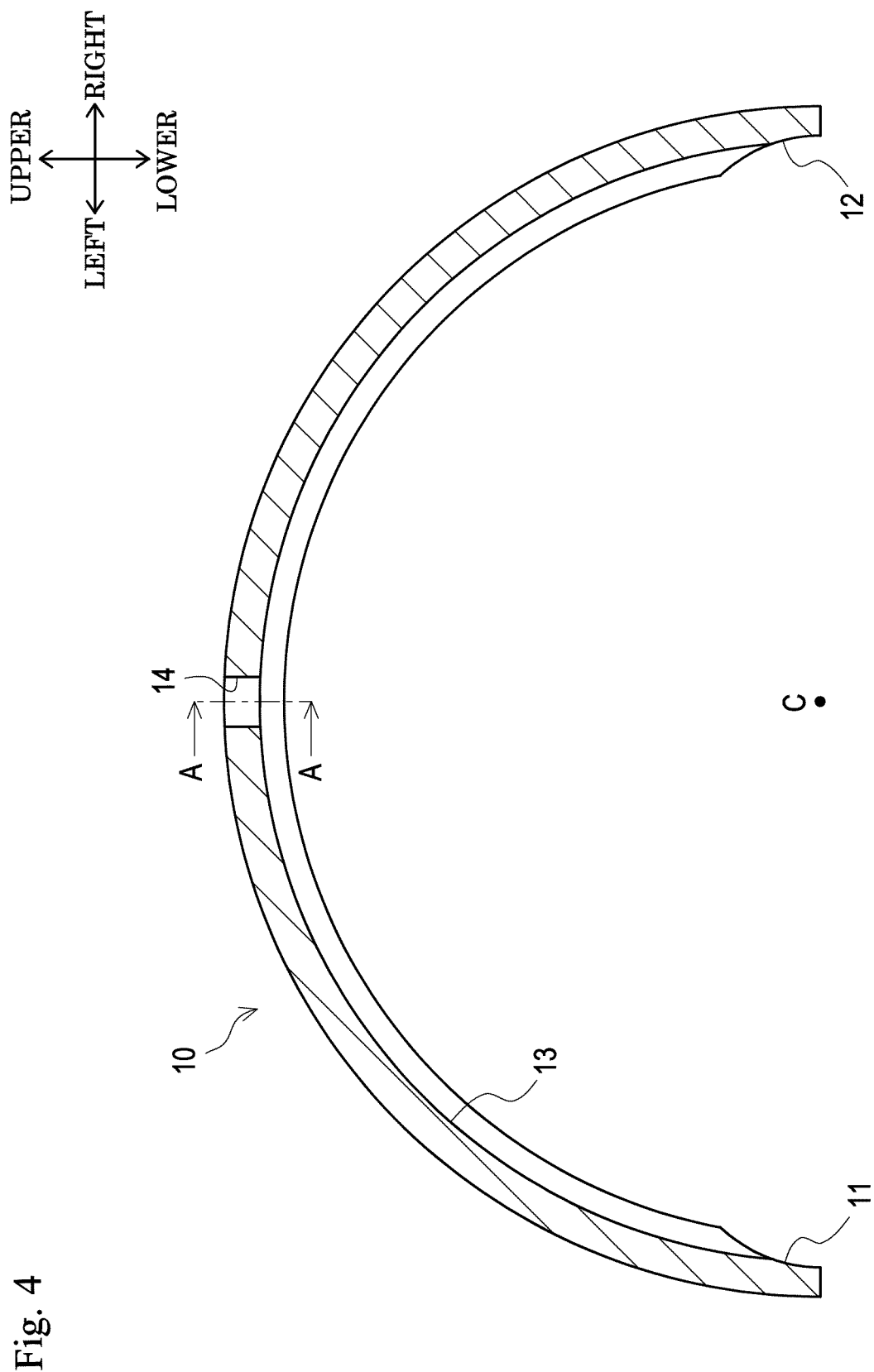
FIG. 4 is a front cross-sectional view showing an upper bearing according to the first embodiment.
Figure 6A:
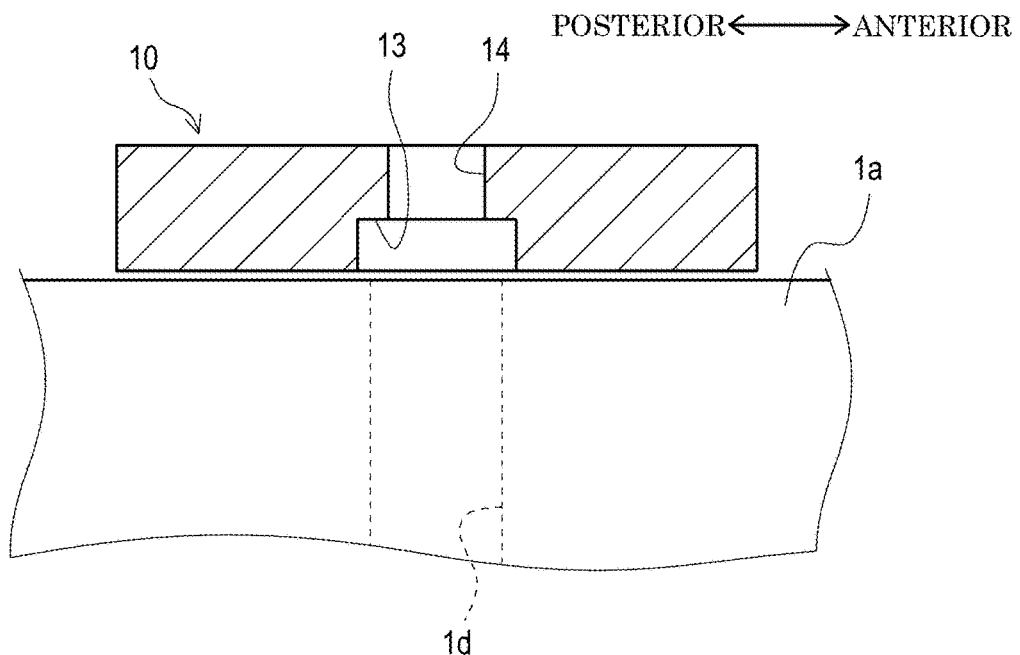
FIG. 6(a) is a cross-sectional view taken along line A-A in FIG. 4.

The upper bearing 10 illustrated in FIGS. 3, 4, and 6(a), which is an embodiment of an upper semi-cylindrical bearing according to the present invention, is a member forming the upper half of the main bearing 2. The upper bearing 10 is formed in a semi-cylindrical shape (i.e., a shape obtained by sectioning a cylinder with a diameter passing through its axis). The upper bearing 10 is disposed in the bearing portion 3d of the body-side housing 3a of the cylinder block 3 with the inner periphery of the upper bearing 10 facing downward (see FIG. 2). The upper bearing 10 mainly includes an upstream crush relief 11, a downstream crush relief 12, an oil groove 13, and the through-hole 14.

The upstream crush relief 11 and the downstream crush relief 12 illustrated in FIGS. 3 and 4, which are an embodiment of upper crush reliefs according to the present invention, are portions formed by cutting away the inner periphery of the upper bearing 10 in a concave shape. The upstream crush relief 11 is formed at a lower left end (i.e., an upstream end in the rotation direction (hereinafter simply referred to as "upstream") of the crank journal 1a) of the upper bearing 10. The downstream crush relief 12 is formed at a lower right end (i.e., a downstream end in the rotation direction (hereinafter simply referred to as "downstream") of the crank journal 1a) of the upper bearing 10. Providing the upper bearing 10 with the upstream crush relief 11 and the downstream crush relief 12 can prevent the occurrence of failure (specifically, partial abutment of a deformed portion against the crank journal 1a) even if the upper bearing 10 is deformed in the vicinity of its both ends.

The oil groove 13 illustrated in FIGS. 3, 4, and 6(a), which is an embodiment of an upper oil groove according to the present invention, is to direct lubricant in the inner periphery of the upper bearing 10 and to store lubricant in the inner periphery in a suitable manner. The oil groove 13 is formed in the inner periphery of the upper bearing 10. The oil groove 13 is formed to extend in the circumferential direction of the upper bearing 10. One end (i.e., an upstream end) of the oil groove 13 communicates with the upstream crush relief 11. The other end (i.e., a downstream end) of the oil groove 13 communicates with the downstream crush relief 12. That is, the oil groove 13 is formed so that the upstream crush relief 11 communicates with the downstream crush relief 12.

The oil groove 13 is formed in the longitudinal center of the upper bearing 10 (see FIG. 6(a)). The oil groove 13 is formed to have a predetermined longitudinal width along its entire length. The oil groove 13 is also formed to have a predetermined depth along its entire length. Here, an opening of the communication oil passage 1d in the crank journal 1a is formed at the same longitudinal position as the oil groove 13. This allows lubricant in the oil groove 13 to be fed to the crank pin 1c (see FIG. 1) through the communication oil passage 1d when the opening of the communication oil passage 1d faces the oil groove 13 as the crank journal 1a rotates.

The through-hole 14 communicates between the inner periphery (more particularly, the oil groove 13) and the outer periphery of the upper bearing 10. The through-hole 14 is formed in the lateral center (i.e., the upper end) of the upper bearing 10.

Figure 5:
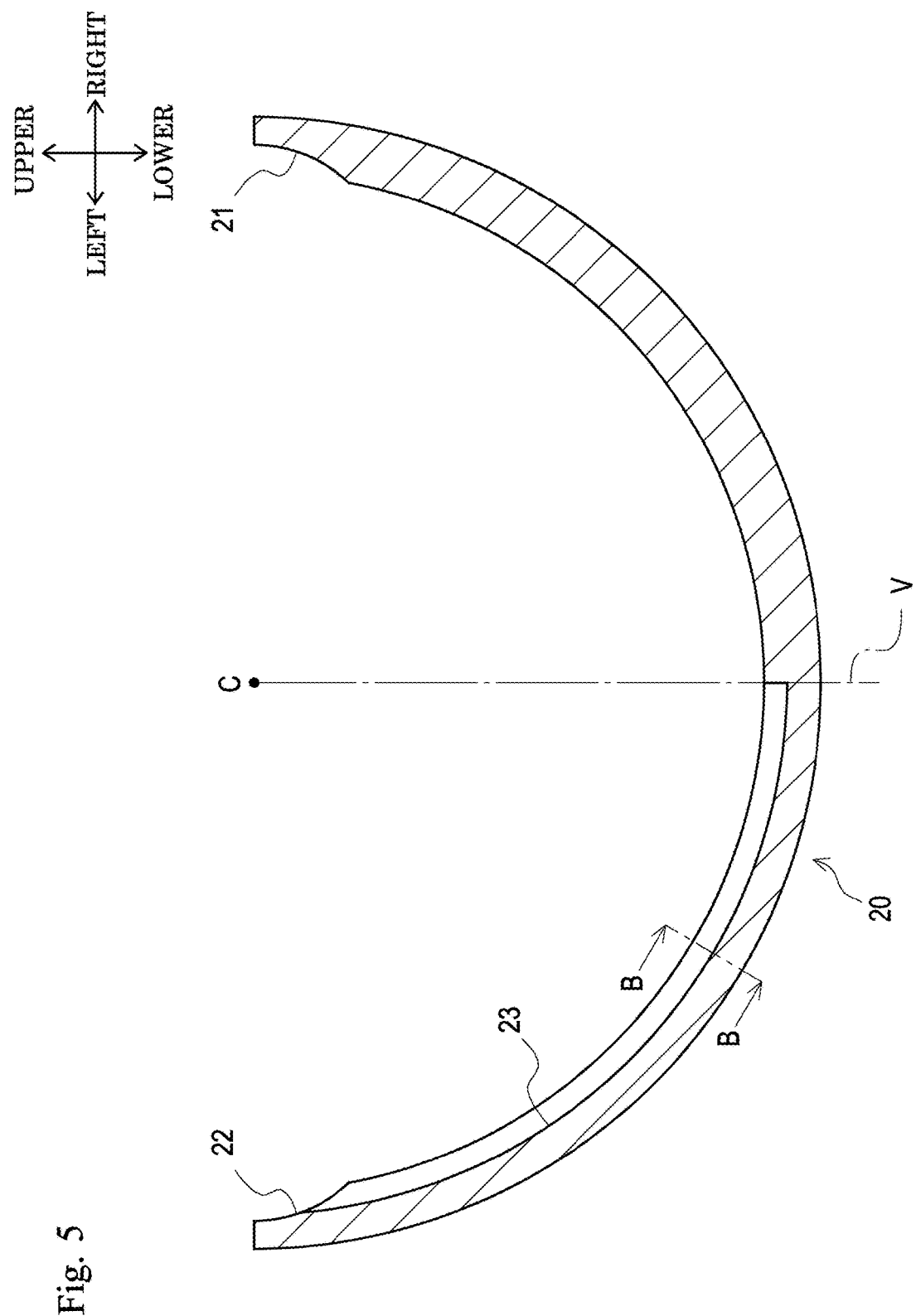
FIG. 5 is a front cross-sectional view showing a lower bearing according to the first embodiment.
Figure 6B:
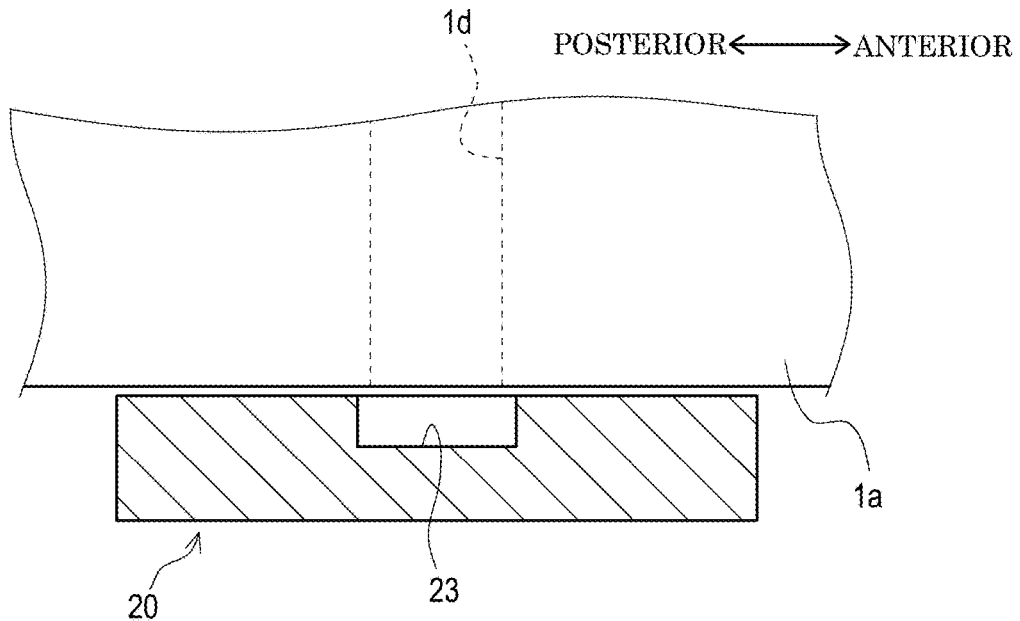
FIG. 6(b) is a cross-sectional view taken along line B-B in FIG. 5.

The lower bearing 20 illustrated in FIGS. 3, 5, and 6(b), which is an embodiment of a lower semi-cylindrical bearing according to the present invention, is a member forming the lower half of the main bearing 2. The lower bearing 20 is formed in a semi-cylindrical shape. The lower bearing 20 is disposed in the bearing portion 3e of the cap 3b of the cylinder block 3 with the inner periphery of the lower bearing 20 facing upward (see FIG. 2). The lower bearing 20 mainly includes an upstream crush relief 21, a downstream crush relief 22, and an oil groove 23.

The upstream crush relief 21 and the downstream crush relief 22 illustrated in FIGS. 3 and 5 are portions formed by cutting away the inner periphery of the lower bearing 20 in a concave shape. The upstream crush relief 21 is formed at an upper right end (i.e., an upstream end) of the lower bearing 20. The downstream crush relief 22, which is an embodiment of a lower crush relief according to the present invention, is formed at an upper left end (i.e., a downstream end) of the lower bearing 20. Providing the lower bearing 20 with the upstream crush relief 21 and the downstream crush relief 22 can prevent the occurrence of failure (specifically, partial abutment of a deformed portion against the crank journal 1a) even if the lower bearing 20 is deformed in the vicinity of its both ends.

The oil groove 23 illustrated in FIGS. 3, 5, and 6(b), which is an embodiment of a lower oil groove according to the present invention, is to direct lubricant in the inner periphery of the lower bearing 20 and to store lubricant in the inner periphery in a suitable manner. The oil groove 23 is formed in the inner periphery of the lower bearing 20. The oil groove 23 is formed to extend in the circumferential direction of the lower bearing 20. The oil groove 23 is formed downstream (i.e., on the left side of straight line V drawn vertically downward from axis C in FIG. 5) of the lateral center of the inner periphery of the lower bearing 20. Specifically, one end (i.e., an upstream end) of the oil groove 23 is formed at the lateral center (i.e., the lower end) of the inner periphery of the lower bearing 20. The other end (i.e., a downstream end) of the oil groove 23 communicates with the downstream crush relief 22.

The oil groove 23 is formed in the longitudinal center of the lower bearing 20 (see FIG. 6(b)), and the oil groove 23 is formed to have a predetermined longitudinal width along its entire length. The oil groove 23 is also formed to have a predetermined depth along its entire length. Here, the opening of the communication oil passage 1d in the crank journal 1a is formed at the same longitudinal position as the oil groove 23. This allows lubricant in the oil groove 23 to be fed to the crank pin 1c (see FIG. 1) through the communication oil passage 1d when the opening of the communication oil passage 1d faces the oil groove 23 as the crank journal 1a rotates.

The flow of lubricant in the upper bearing 10 and the lower bearing 20 is described below with reference to FIG. 3.

Lubricant, which is externally fed to the inner periphery (oil groove 13) of the upper bearing 10 through the through-hole 14, passes downwardly through the oil groove 13 associated with gravity and rotation of the crank journal 1a. In particular, the crank journal 1a rotating clockwise as viewed from the front causes the lubricant to pass through the oil groove 13 in a clockwise direction as viewed from the front. Some of the lubricant passing through the oil groove 13 is fed to a sliding surface between the upper bearing 10 and the crank journal 1a to form an oil film on this sliding surface.

Part of the lubricant passing to the end (in particular, the downstream end) of the oil groove 13 is discharged outside the upper bearing 10 (main bearing 2) through the downstream crush relief 12. The remaining part of the lubricant is fed to the inner periphery of the lower bearing 20 through the downstream crush relief 12 and the upstream crush relief 21. The lubricant forms an oil film on a sliding surface between the lower bearing 20 and the crank journal 1a. The lubricant passes through the sliding surface between the lower bearing 20 and the crank journal 1a in a clockwise direction as viewed from the front as the crank journal 1a rotates. Some of the lubricant is fed to the oil groove 23 of the lower bearing 20. The lubricant in the oil groove 23 passes through the oil groove 23 in a clockwise direction as viewed from the front as the crank journal 1a rotates.

Part of the lubricant passing to the end (i.e., the downstream end) of the oil groove 23 is discharged outside the lower bearing 20 (main bearing 2) through the downstream crush relief 22. The remaining part of the lubricant is fed to the inner periphery (oil groove 13) of the upper bearing 10 through the downstream crush relief 22 and the upstream crush relief 11.

Foreign matter, such as powder caused by dust and metal wear, may enter lubricant. Foreign matter moving onto the sliding surface between the crank journal 1a and the main bearing 2 may cause galling due to the foreign matter.

In the present embodiment, foreign matter S entering the lubricant in the oil groove 23 passes through the oil groove 23 along with the lubricant in the clockwise direction as viewed from the front, as illustrated in FIG. 7. The foreign matter S, as well as the lubricant, is discharged outside the lower bearing 20 through the downstream crush relief 22. In this manner, the downstream end of the oil groove 23 of the lower bearing 20 communicating with the downstream crush relief 22 helps foreign matter S to be discharged outwardly and, thus, the occurrence of galling of the main bearing 2 can be prevented or reduced.

Even if foreign matter S is fed to the oil groove 13 of the upper bearing 10 through the upstream crush relief 11 without being discharged from the downstream crush relief 22 to the outside, the foreign matter S passes downstream through the oil groove 13 along with the lubricant. The foreign matter S, as well as the lubricant, is then discharged from the downstream end of the oil groove 13 to the outside through the downstream crush relief 12 (see e.g. FIG. 3). In this manner, foreign matter S, which could not be discharged from the downstream crush relief 22 of the lower bearing 20, can also be discharged from the downstream crush relief 12 of the upper bearing 10.

As described above, the main bearing 2 (slide bearing) according to the present embodiment is a cylindrical bearing that is formed by combining the upper bearing 10 (upper semi-cylindrical bearing) disposed on the upper side and the lower bearing 20 (lower semi-cylindrical bearing) disposed on the lower side and rotatably supports the crank journal 1a (shaft member). The lower bearing 20 includes the downstream crush relief 22 (lower crush relief) formed at the downstream end in the rotation direction of the crank journal 1a in the inner periphery of the lower bearing 20; and the oil groove 23 (lower oil groove) formed in the inner periphery of the lower bearing 20 so as to communicate with the downstream crush relief 22.

Such a configuration helps foreign matter entering the oil groove 23 to be discharged from the downstream crush relief 22 to the outside as the crank journal 1a rotates. This prevents or reduces the occurrence of galling of the main bearing 2.

In the case where the lubricant is fed from the crank journal 1a to the crank pin 1c as described in the present embodiment, the main bearing 2 supporting the crank journal 1a helps foreign matter to be discharged, thereby reducing the amount of foreign matter fed to the crank pin 1c. This prevents or reduces the occurrence of galling in the crank pin 1c (connecting rod bearing 4).

Also, lubricant is likely to be discharged from the downstream crush relief 22 to the outside, and a temperature increase in the lubricant in the oil groove 23 can be prevented or reduced. This prevents or reduces the occurrence of galling due to the temperature increase in the lubricant.

The oil groove 23 is formed only on the downstream side in the rotation direction of the crank journal 1a (i.e., on the left side of straight line V in FIG. 5) in the inner periphery of the lower bearing 20.

Such a configuration provides a large surface for receiving the crank journal 1a. That is, as large an area of the inner periphery of the lower bearing 20 having a sliding contact with the crank journal 1a as possible allows a heavy load to be supported.

The upper bearing 10 includes the upstream crush relief 11 and the downstream crush relief 12 (i.e., upper crush reliefs) formed at the upstream and downstream ends, respectively, in the rotation direction of the crank journal 1a in the inner periphery of the upper bearing; and the oil groove 13 (upper oil groove) formed in the inner periphery of the upper bearing 10 to communicate from one (upstream crush relief 11) of the upper crush reliefs to the other (downstream crush relief 12).

Such a configuration allows foreign matter S to be discharged from the downstream crush relief 12 through the oil groove 13 even if there remains the foreign matter S that has not been discharged from the downstream crush relief 22. This prevents or reduces the occurrence of galling of the main bearing 2 more effectively.

The present embodiment includes a lubricant feed mechanism that includes the crankshaft 1 having the communication oil passage 1d that communicates between the outer periphery of the crank journal 1a and the outer periphery of the crank pin 1c and directs lubricant from the outer periphery of the crank journal 1a to the outer periphery of the crank pin 1c, the crank journal 1a being rotatably supported by the main bearing 2.

Such a configuration can reduce the amount of foreign matter S contained in the lubricant fed to the crank pin 1c. This prevents or reduces the occurrence of galling of the crank pin 1c.

While the present embodiment shows an example of applying the slide bearing according to the present invention to the main bearing 2 rotatably supporting the crank journal 1a, the present invention is not limited thereto. That is, the present invention is also applicable to other slide bearings (e.g., the connecting rod bearing 4 interposed between the crank pin 1c and the connecting rod 5).

Although in the present embodiment the oil groove 23 of the lower bearing 20 is formed to extend from the lateral center of the inner periphery of the lower bearing 20 to the downstream crush relief 22, the present invention is not limited thereto. That is, the oil groove 23 may be of any length if it communicates with the downstream crush relief 22. For example, the oil groove 23 may be formed smaller than that of the present embodiment, thereby providing a larger surface for receiving the crank journal 1a.

The structure of a main bearing 102 according to a second embodiment of the slide bearing according to the present invention is described below in detail with reference to FIGS. 8 through 12.

Figure 8:
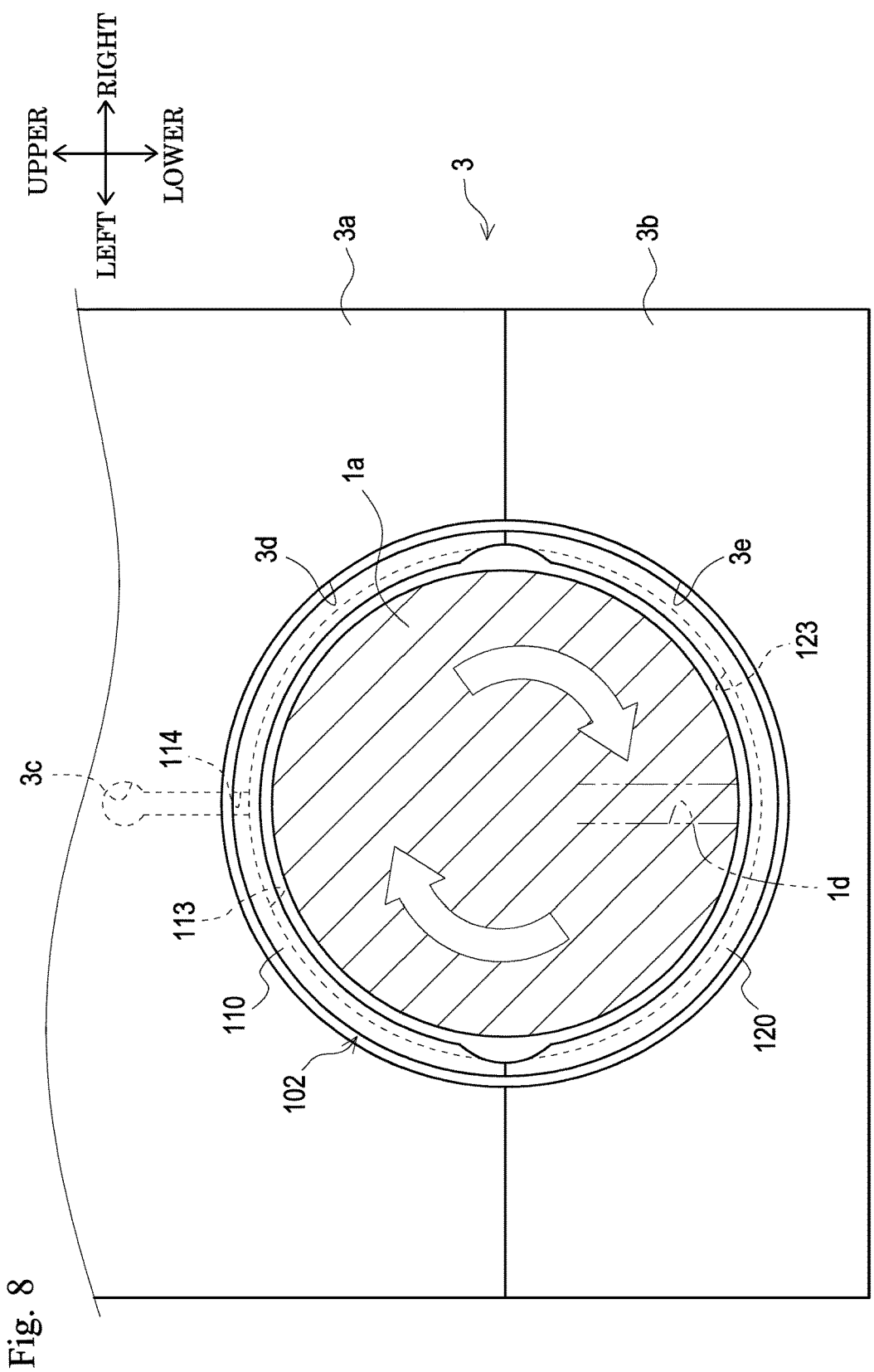
FIG. 8 is a front cross-sectional view showing a structure of a supporting portion of a crank journal according to a second embodiment.
Figure 9:
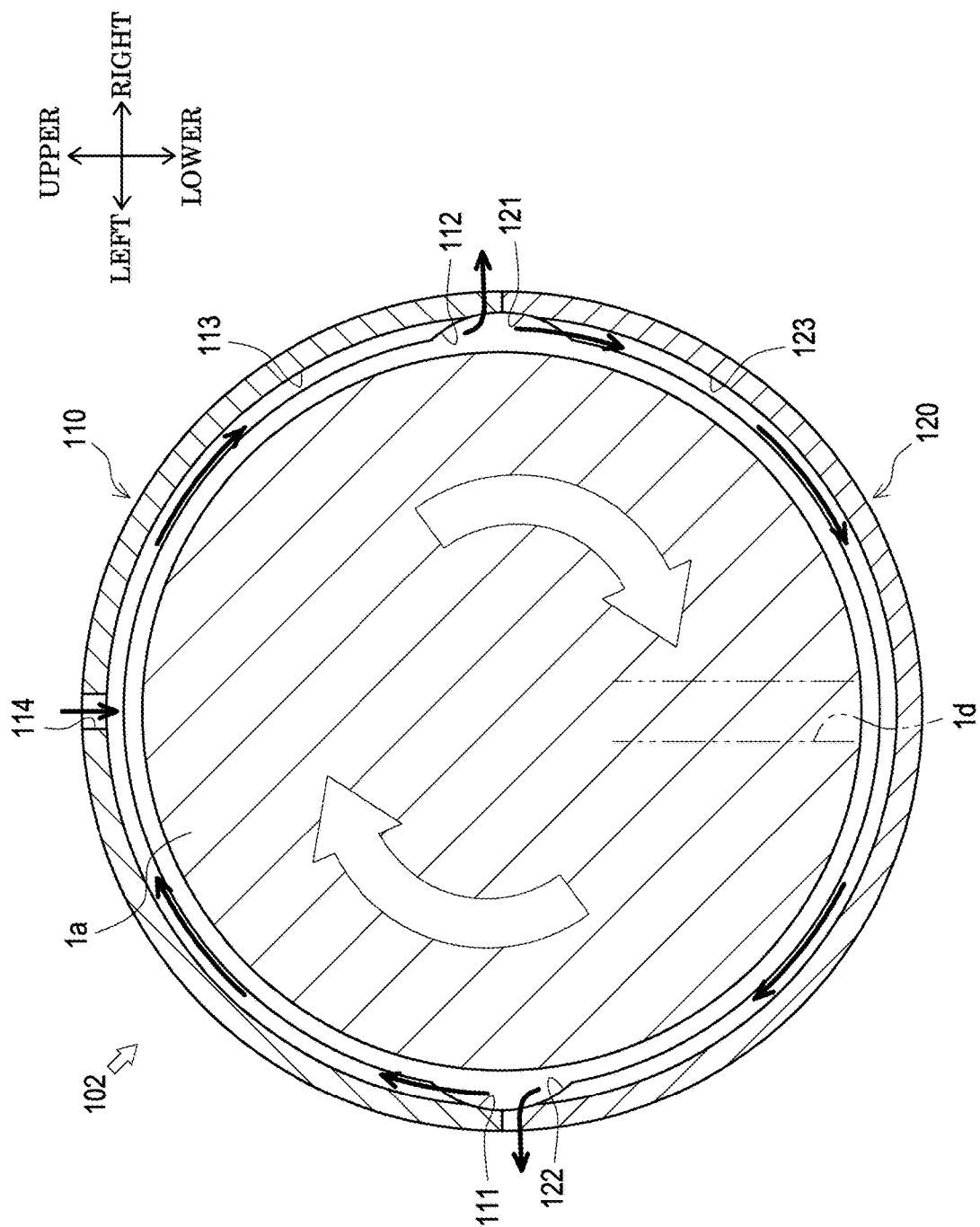
FIG. 9 is a front cross-sectional view showing a main bearing and the crank journal according to the second embodiment.

The main bearing 102 illustrated in FIGS. 8 and 9 is a cylindrical slide bearing for rotatably supporting the crank journal 1a. The main bearing 102 includes a pair of semi-cylindrical bearings (i.e., an upper bearing 110 and a lower bearing 120). The combination of the upper bearing 110 and the lower bearing 120 vertically opposed to each other provides a cylindrical main bearing 102.

Figure 10:
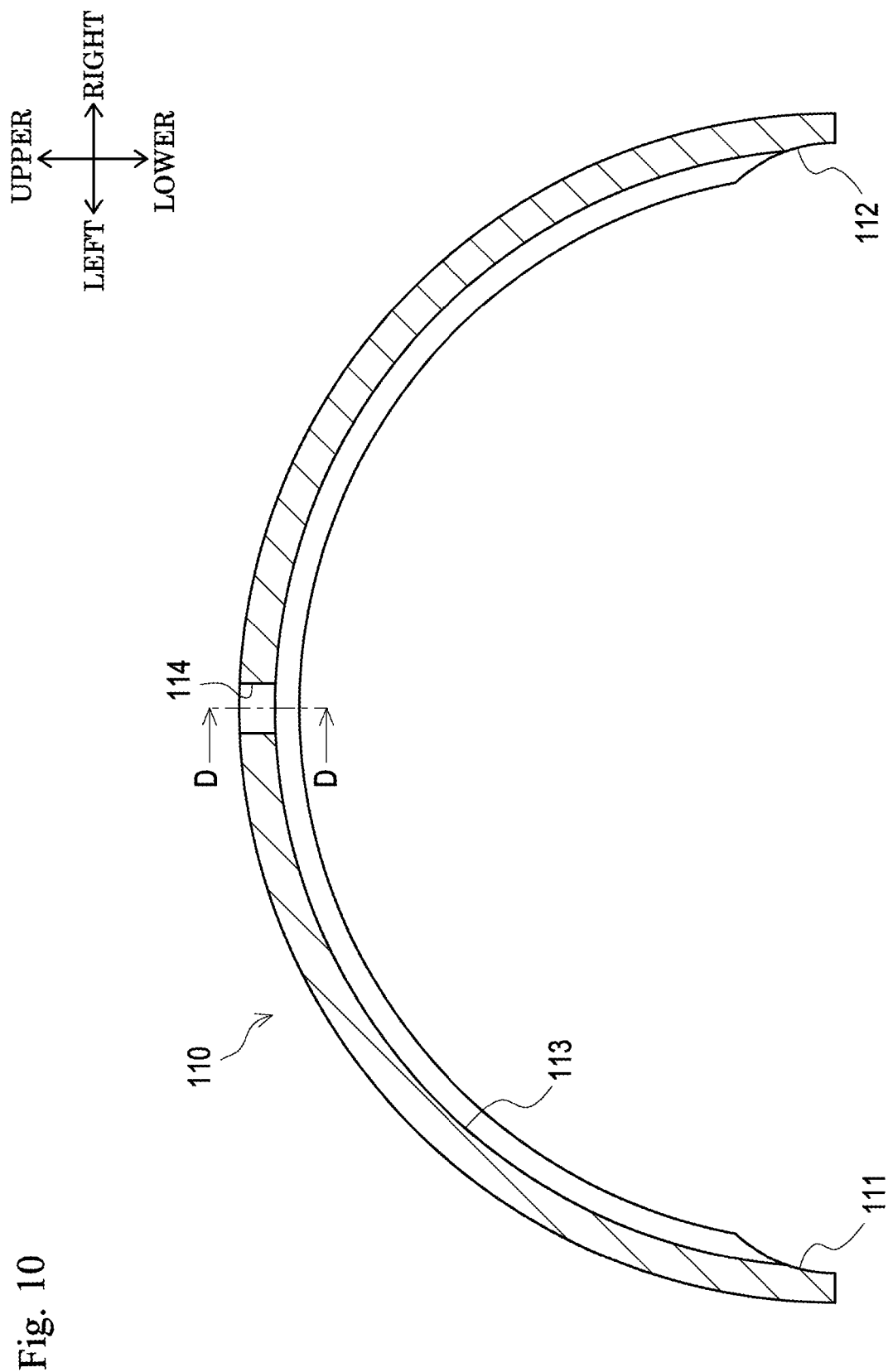
FIG. 10 is a front cross-sectional view showing an upper bearing according to the second embodiment.
Figure 12A:
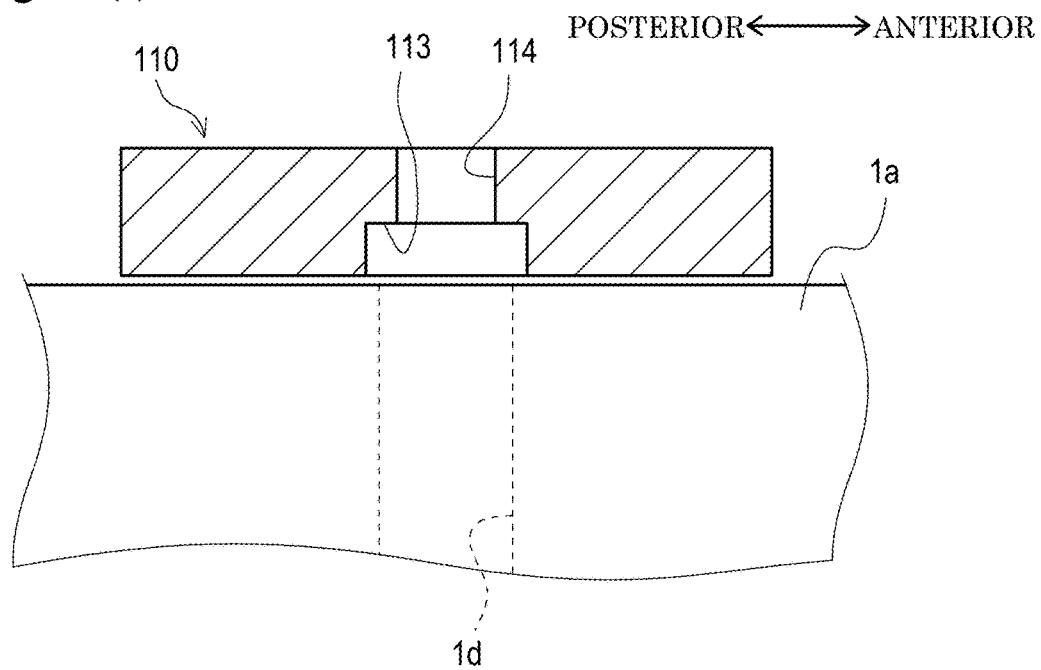
FIG. 12(a) is a cross-sectional view taken along line D-D in FIG. 10.
Figure 12B:
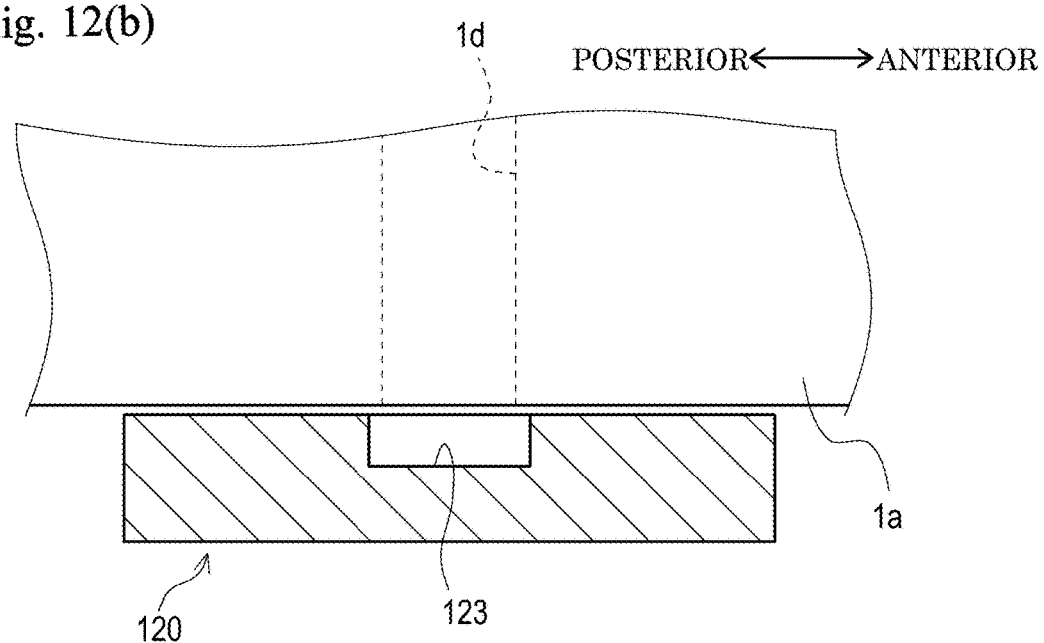
FIG. 12(b) is a cross-sectional view taken along line E-E in FIG. 11.

The upper bearing 110 illustrated in FIGS. 9, 10, and 12(*a*), which is an embodiment of a semi-cylindrical bearing according to the present invention, is a member forming the upper half of the main bearing 102. The upper bearing 110 is formed in a semi-cylindrical shape (i.e., a shape obtained by sectioning a cylinder with a diameter passing through its axis). The upper bearing 110 is disposed in the bearing portion 3*d* of the body-side housing 3*a* of the cylinder block 3 with the inner periphery of the upper bearing 110 facing downward (see FIG. 8). The upper bearing 110 mainly includes an upstream crush relief 111, a downstream crush relief 112, an oil groove 113, and a through-hole 114.

The upstream crush relief 111 and the downstream crush relief 112 illustrated in FIGS. 9 and 10 are portions formed by cutting away the inner periphery of the upper bearing 110 in a concave shape. The upstream crush relief 111 is formed at a lower left end (i.e., an upstream end in the rotation direction (hereinafter simply referred to as "upstream") of the crank journal 1*a*) of the upper bearing 110. The downstream crush relief 112 is formed at a lower right end (i.e., a downstream end in the rotation direction (hereinafter simply referred to as "downstream") of the crank journal 1*a*) of the upper bearing 110. Providing the upper bearing 110 with the upstream crush relief 111 and the downstream crush relief 112 can prevent the occurrence of failure (specifically, partial abutment of a deformed portion against the crank journal 1*a*) even if the upper bearing 110 is deformed in the vicinity of its both ends.

The oil groove 113 illustrated in FIGS. 9, 10, and 12(*a*) is to direct lubricant in the inner periphery of the upper bearing 110 and to store lubricant in the inner periphery in a suitable manner. The oil groove 113 is formed in the inner periphery of the upper bearing 110. The oil groove 113 is formed to extend in the circumferential direction of the upper bearing 110. One end (i.e., an upstream end) of the oil groove 113 communicates with the upstream crush relief 111. The other end (i.e., a downstream end) of the oil groove 113 communicates with the downstream crush relief 112. That is, the oil groove 113 is formed so that the upstream crush relief 111 communicates with the downstream crush relief 112.

The oil groove 113 is formed in the longitudinal center of the upper bearing 110 (see FIG. 12(*a*)). The oil groove 113 is formed to have a predetermined longitudinal width along its entire length. The oil groove 113 is also formed to have a predetermined depth along its entire length. Here, an opening of the communication oil passage 1*d* in the crank journal 1*a* is formed at the same longitudinal position as the oil groove 113. This allows lubricant in the oil groove 113 to be fed to the crank pin 1*c* (see FIG. 1) through the communication oil passage 1*d* when the opening of the communication oil passage 1*d* faces the oil groove 113 as the crank journal 1*a* rotates.

The through-hole 114, which is an embodiment of an oil feed hole according to the present invention, communicates between the inner periphery (more particularly, the oil groove 113) and the outer periphery of the upper bearing 110. The through-hole 114 is formed in the lateral center (i.e., the upper end) of the upper bearing 110.

Figure 11:
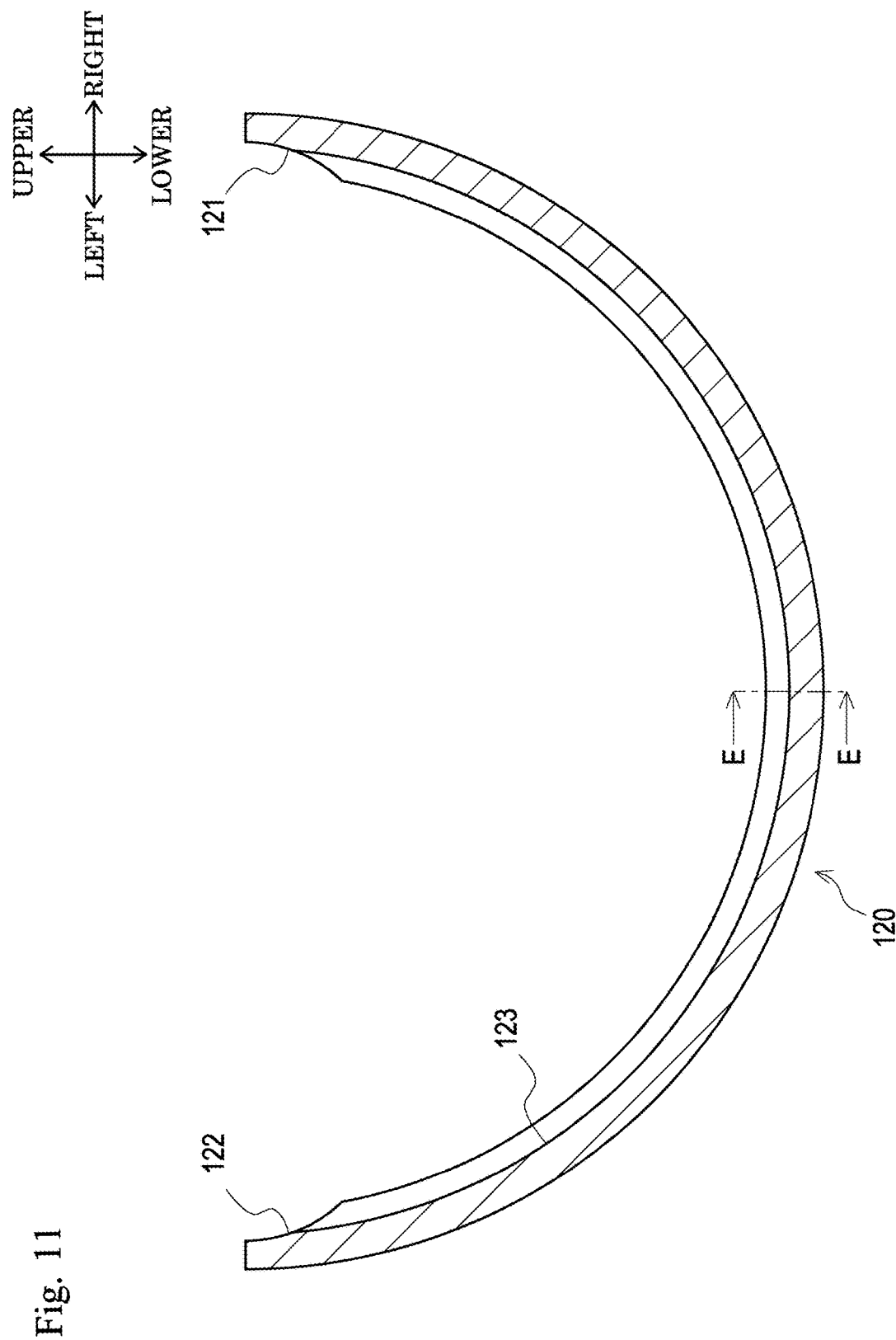
FIG. 11 is a front cross-sectional view showing a lower bearing according to the second embodiment.

The lower bearing 120 illustrated in FIGS. 9, 11, and 12(*b*), which is an embodiment of a semi-cylindrical bearing according to the present invention, is a member forming the lower half of the main bearing 102. The lower bearing 120 is formed in a semi-cylindrical shape. The lower bearing 120 is disposed in the bearing portion 3*e* of the cap 3*b* of the cylinder block 3 with the inner periphery of the lower bearing 120 facing upward (see FIG. 8). The lower bearing 120 mainly includes an upstream crush relief 121, a downstream crush relief 122, and an oil groove 123.

The upstream crush relief 121 and the downstream crush relief 122 illustrated in FIGS. 9 and 11 are portions formed by cutting away the inner periphery of the lower bearing 120 in a concave shape. The upstream crush relief 121 is formed at an upper right end (i.e., an upstream end) of the lower bearing 120. The downstream crush relief 122 is formed at an upper left end (i.e., a downstream end) of the lower bearing 120. Providing the lower bearing 120 with the upstream crush relief 121 and the downstream crush relief 122 can prevent the occurrence of failure (specifically, partial abutment of a deformed portion against the crank journal 1*a*) even if the lower bearing 120 is deformed in the vicinity of its both ends.

The oil groove 123 illustrated in FIGS. 9, 11, and 12(*b*) is to direct lubricant in the inner periphery of the lower bearing 120 and to store lubricant in the inner periphery in a suitable manner. The oil groove 123 is formed in the inner periphery of the lower bearing 120. The oil groove 123 is formed to extend in the circumferential direction of the lower bearing 120. One end (i.e., an upstream end) of the oil groove 123 communicates with the upstream crush relief 121. The other end (i.e., a downstream end) of the oil groove 123 communicates with the downstream crush relief 122. That is, the oil groove 123 is formed so that the upstream crush relief 121 communicates with the downstream crush relief 122.

The oil groove 123 is formed in the longitudinal center of the lower bearing 120 (see FIG. 12(*b*)), and the oil groove 123 is formed to have a predetermined longitudinal width along its entire length. The oil groove 123 is also formed to have a predetermined depth along its entire length. Here, the opening of the communication oil passage 1*d* in the crank journal 1*a* is formed at the same longitudinal position as the oil groove 123. This allows lubricant in the oil groove 123 to be fed to the crank pin 1*c* (see FIG. 1) through the communication oil passage 1*d* when the opening of the communication oil passage 1*d* faces the oil groove 123 as the crank journal 1*a* rotates.

The flow of lubricant in the upper bearing 110 and the lower bearing 120 is described below with reference to FIG. 9.

Lubricant, which is externally fed to the inner periphery (oil groove 113) of the upper bearing 110 through the through-hole 114, passes downwardly through the oil groove 113 associated with gravity and rotation of the crank journal 1*a*. In particular, the crank journal 1*a* rotating clockwise as viewed from the front causes the lubricant to pass through the oil groove 113 in a clockwise direction as viewed from the front. Some of the lubricant passing through the oil groove 113 is fed to a sliding surface between the upper bearing 110 and the crank journal 1*a* to form an oil film on this sliding surface.

Part of the lubricant passing to the end (in particular, the downstream end) of the oil groove 113 is discharged outside the upper bearing 110 (main bearing 102) through the downstream crush relief 112. The remaining part of the lubricant is fed to the oil groove 123 of the lower bearing 120 through the downstream crush relief 112 and the upstream crush relief 121. The crank journal 1*a* rotating clockwise as viewed from the front causes the lubricant to pass through the oil groove 123 in a clockwise direction as viewed from the front. Some of the lubricant passing through the oil groove 123 is fed to a sliding surface between the lower bearing 120 and the crank journal 1a to form an oil film on this sliding surface.

Part of the lubricant passing to the downstream end of the oil groove 123 is discharged outside the lower bearing 120 (main bearing 102) through the downstream crush relief 122. The remaining part of the lubricant is fed to the inner periphery (oil groove 113) of the upper bearing 110 through the downstream crush relief 122 and the upstream crush relief 111.

Figure 13:
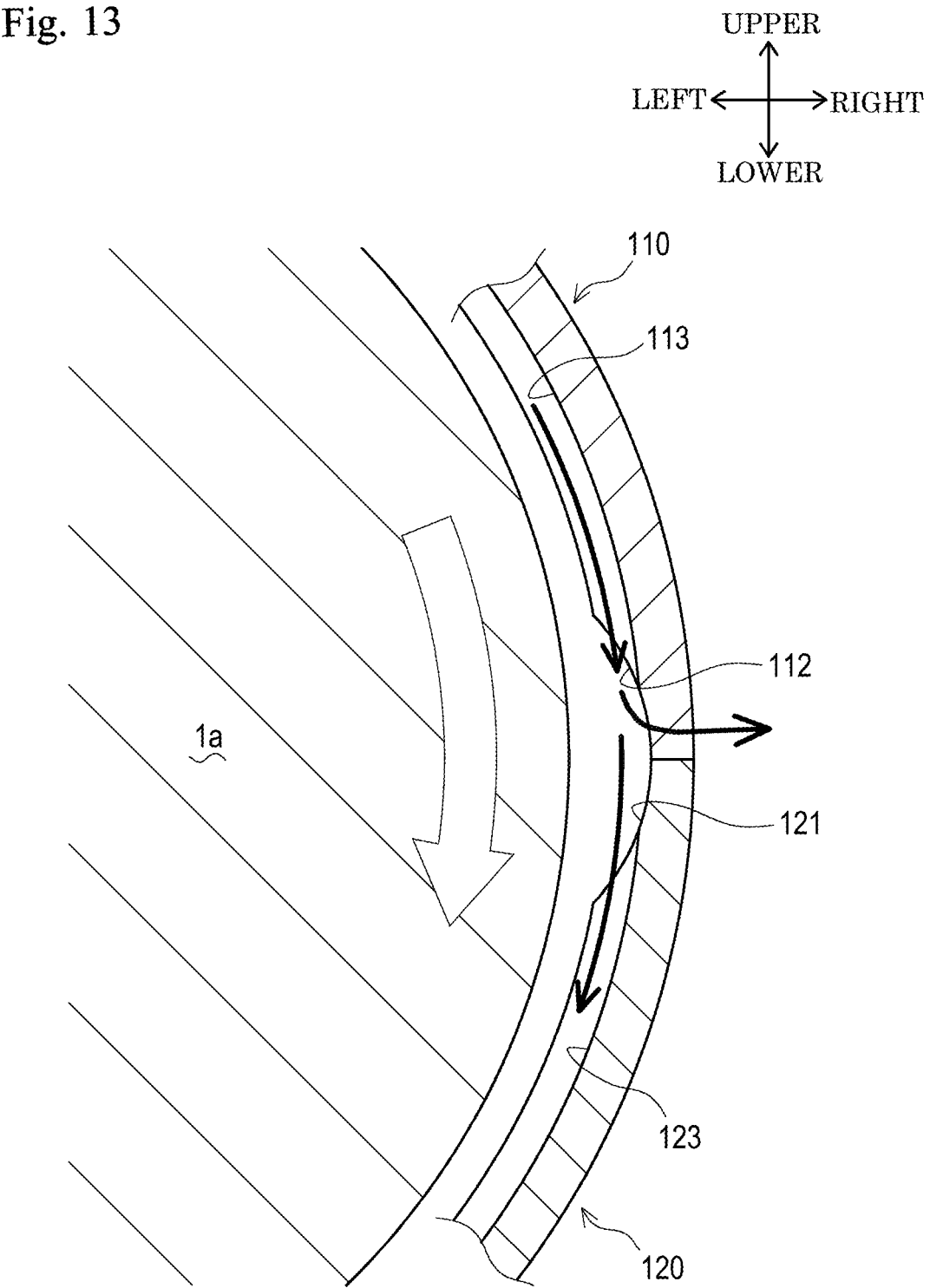
FIG. 13 is an enlarged front cross-sectional view showing a downstream end of the upper bearing and an upstream end of the lower bearing according to the second embodiment.

Here, as illustrated in FIG. 13, the oil groove 123 of the lower bearing 120 communicates with the upstream crush relief 121, and this facilitates the feeding of lubricant into the oil groove 123 through the upstream crush relief 121. As illustrated in FIG. 14, the oil groove 123 of the lower bearing 120 also communicates with the downstream crush relief 122, and this helps the lubricant passing through the oil groove 123 to be discharged to the outside through the downstream crush relief 122.

In this manner, the oil groove 123 communicates with the upstream crush relief 121 and the downstream crush relief 122, and this helps the lubricant to flow into the oil groove 123 and to be discharged from the oil groove 123. As such, lubricant heated to a high temperature by friction (sliding) between the crank journal 1a and the main bearing 102 (lower bearing 120) is unlikely to remain in the oil groove 123. This prevents or reduces a temperature increase in the lubricant in the oil groove 123 and, thus, the occurrence of galling can be prevented or reduced.

Likewise, as illustrated in FIG. 14, the oil groove 113 of the upper bearing 110 communicates with the upstream crush relief 111, and this facilitates the feeding of lubricant into the oil groove 113 through the upstream crush relief 111. As illustrated in FIG. 13, the oil groove 113 of the upper bearing 110 also communicates with the downstream crush relief 112, and this helps the lubricant passing through the oil groove 113 to be discharged to the outside through the downstream crush relief 112.

In this manner, the oil groove 113 communicates with the upstream crush relief 111 and the downstream crush relief 112, and this helps the lubricant to flow into the oil groove 113 and to be discharged from the oil groove 113 and, thus, prevents or reduces a temperature increase in the lubricant in the oil groove 113.

As described above, the main bearing 102 (slide bearing) according to the present embodiment is a cylindrical bearing that is formed by combining the pair of upper bearing 110 and lower bearing 120 (i.e., semi-cylindrical bearings) and rotatably supports the crank journal 1a (shaft member). The pair of upper bearing 110 and lower bearing 120 includes the respective crush reliefs (upstream crush relief 111 and downstream crush relief 112, and upstream crush relief 121 and downstream crush relief 122) formed at the upstream and downstream ends, respectively, in the rotation direction of the crank journal 1a in the inner peripheries of the upper bearing 110 and the lower bearing 120; and the respective oil grooves (oil groove 113 and oil groove 123) formed in the inner peripheries of the upper bearing 110 and the lower bearing 120, respectively, to communicate from one of the respective crush reliefs to the other.

Such a configuration helps lubricant in the oil groove to be discharged from the crush relief to the outside. This prevents or reduces a temperature increase in the lubricant in the oil groove and, thus, the occurrence of galling of the main bearing 102 can be prevented or reduced.

In the case where the lubricant is fed from the crank journal 1a to the crank pin 1c as described in the present embodiment, a temperature increase in the lubricant fed from the crank journal 1a (main bearing 102) to the crank pin 1c can be prevented or reduced. This prevents or reduces the occurrence of galling of the crank pin 1c.

The lubricant feed mechanism according to the present embodiment includes the crankshaft 1 having the communication oil passage 1d that communicates between the outer periphery of the crank journal 1a and the outer periphery of the crank pin 1c and directs lubricant from the outer periphery of the crank journal 1a to the outer periphery of the crank pin 1c; and the main bearing 102, the crank journal 1a being rotatably supported by the main bearing 102.

Such a configuration prevents or reduces a temperature increase in the lubricant fed from the main bearing 102 to the crank pin 1c and, thus, the occurrence of galling of the crank pin 1c can be prevented or reduced.

While the present embodiment shows an example of applying the slide bearing according to the present invention to the main bearing 102 rotatably supporting the crank journal 1a, the present invention is not limited thereto. That is, the present invention is also applicable to other slide bearings (e.g., the connecting rod bearing 4 interposed between the crank pin 1c and the connecting rod 5).

Although in the present embodiment both upper bearing 110 and lower bearing 120 are provided with the respective oil grooves that communicate with the respective crush reliefs at their ends, the present invention is not limited thereto. That is, only one of the upper bearing 110 and the lower bearing 120 may be provided with an oil groove that communicates with crush reliefs at its ends.

Although in the present embodiment the oil groove 123 is formed to have a predetermined depth along its entire length, the present invention is not limited thereto. For example, as illustrated in FIG. 15, the depth of a downstream end 123b of the oil groove 123 may be reduced compared to the depth of a middle portion 123a of the oil groove 123. Reducing the depth of the downstream end 123b of the oil groove 123 in this way can limit the amount of the lubricant flowing from the oil groove 123 to the downstream crush relief 122. Thus, the amount of lubricant required to lubricate the main bearing 102 (i.e., the amount of lubricant in the oil groove 123) can be ensured while helping lubricant to be discharged outwardly.

Figure 16:
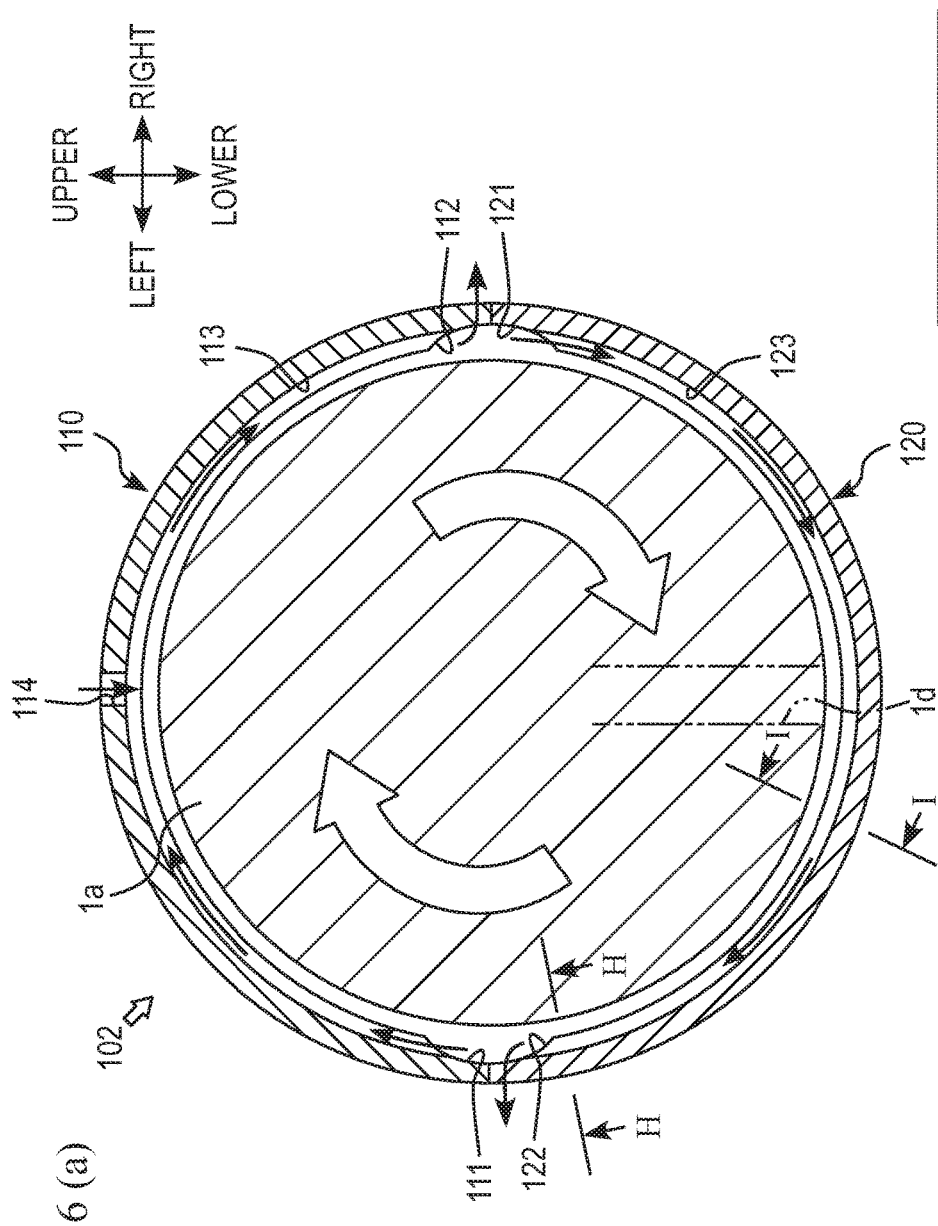
FIG. 16(a) is a front cross-sectional view showing a main bearing and the crank journal according to another embodiment.
FIGS. 16(b) and 16(c) are cross-sectional views taken through FIG. 16(a).
Figure 16:
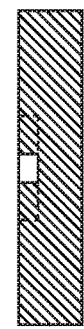
Figure 16:

While the depth of the end 123b of the oil groove 123 is reduced in the example illustrated in FIG. 15, the present invention is not limited thereto. That is, the end 123b of the oil groove 123 only needs to be formed such that the cross-sectional area of the end 123b is smaller than that of the middle portion 123a. For example, the longitudinal width of the end 123b of the oil groove 123 may be reduced, as seen in FIGS. 16(b) and 16(c), which illustrate cross-sections H and I, respectively. The end 123b of the oil groove 123 having a suitably determined cross-sectional area can limit lubricant flowing into the downstream crush relief 122 through the end 123b to any amount.

INDUSTRIAL APPLICABILITY

The present invention is applicable to a cylindrical slide bearing that is formed by combining a pair of semi-cylindrical bearings and rotatably supports a shaft member and a lubricant feed mechanism having the cylindrical slide bearing.

The invention claimed is:
1. A slide bearing having a cylindrical shape, comprising an upper semi-cylindrical bearing and a lower semi-cylindrical bearing, the slide bearing rotatably supporting a shaft member, wherein the upper semi-cylindrical bearing comprises:

upper crush reliefs formed at upstream and downstream ends in the rotation direction of the shaft member in an inner periphery of the upper semi-cylindrical bearing, and an upper oil groove formed in the inner periphery of the upper semi-cylindrical bearing so as to communicate from the upper crush relief formed at the upstream end to the upper crush relief formed at the downstream end, the lower semi-cylindrical bearing comprises:

lower crush reliefs formed at upstream and downstream ends in the rotation direction of the shaft member in an inner periphery of the lower semi-cylindrical bearing, and a lower oil groove formed in the inner periphery of the lower semi-cylindrical bearing so as to communicate from the lower crush relief formed at the upstream end to the lower crush relief formed at the downstream end, wherein each of the upper oil groove and the lower oil groove is formed to have a constant depth and longitudinal width along its entire length except for the downstream end of the lower oil groove which has a smaller cross-sectional area than that of a middle portion of the lower oil groove, the smaller cross-sectional area having a reduced depth or a reduced longitudinal width.

2. A lubricant feed mechanism comprising:

a crankshaft having a communication oil passage that communicates between an outer periphery of a crank journal and an outer periphery of a crank pin and directs lubricant from the outer periphery of the crank journal to the outer periphery of the crank pin; and the slide bearing according to claim 1, wherein the crank journal is rotatably supported by the slide bearing.

\* \* \* \* \*